United States Patent [19]

Malueg

[11] 3,950,099

[45] Apr. 13, 1976

[54] TWO-AXIS IMAGE MOTION DETECTOR

[75] Inventor: Richard M. Malueg, Glendora, Calif.

[73] Assignee: Actron Industries, Inc., Monrovia, Calif.

[22] Filed: Nov. 1, 1972

[21] Appl. No.: 302,769

[52] U.S. Cl. ......... 356/28; 250/203 R; 250/231 SE; 250/233; 356/152
[51] Int. Cl.² ...................... G01P 3/36; G01J 1/20
[58] Field of Search. 356/28, 152; 250/233, 231 SE, 250/203 R

[56] References Cited
UNITED STATES PATENTS

| | | | |
|---|---|---|---|
| 2,941,080 | 6/1960 | Hansen | 250/203 R |
| 3,500,050 | 3/1970 | Hillman | 356/28 |
| 3,511,150 | 5/1970 | Whitney et al. | 356/28 |

*Primary Examiner*—Maynard R. Wilbur
*Assistant Examiner*—S. C. Buczinski
*Attorney, Agent, or Firm*—Marvin H. Kleinberg

[57] ABSTRACT

A two-axis image motion detector detects two separate velocity channels through a single optical channel with a single photo detector. A single disc rotates at a substantially constant rotational speed and contains a pair of orthogonal grid patterns of different spatial frequencies. Preferably, each grid pattern is at 45° with respect to a radial. An image focused on the grid pattern modulates the carrier frequencies determined by the different grid patterns, thereby generating a composite output in the single photo detector representing the sum of the two image motion channels. Standard filtering and demodulating techniques generate a DC voltage proportional to the image rate for each of the orthogonal axes.

11 Claims, 5 Drawing Figures

TWO-AXIS IMAGE MOTION DETECTOR

BACKGROUND OF THE INVENTION

1. Field of the Invention

This invention relates to an image motion detector system and, more particularly, to an improved two-axis system utilizing a single image detector.

2. Description of the Prior Art

Image motion detectors have great utility for use in aircraft movement with respect to a frame of reference such as the three-axis inertial space through which the aircraft moves. An aircraft can generally be held at a fixed altitude ($h$), thereby requiring detailed information only with respect to the other two axes (X, Y). Such information is necessary for orienting and stabilizing sensitive and accurate equipment located on the aircraft, such as cameras or telescopes, or for use in connection with navigation systems for determining, for example, the angular rate of the aircraft relative to a point on the earth. This information is necessary to determine the effect of the Doppler shift as the aircraft passes over a given reference point on the earth. This Doppler shift is proportional to the ratio of velocity over altitude (V/H or V/R), which is employed with Doppler navigation techniques.

In the prior art, single-axis systems have included rotating discs of the episcotister type having a plurality of opaque and transparent grid bands emanating radially from the center of the disc. An image is focused on a portion of the disc, corresponding to one of the axes about which information is sought. A reference signal, for example, a light-emitting diode, is also focused on the disc in the same plane as the image. Separate photo detectors, that is, one corresponding to the image and one corresponding to the reference source, respond to the image.

Information with respect to a second axis is obtainable by focusing the same image on the disc on a radial that is displaced by 90° with respect to the first image. Another reference light-emitting diode, located in the same plane as the second axis, is used. A photo diode detects the image passing through the disc in the second axis and compares the output with still another photo diode receiving the second axis reference signal. Appropriate electronics determine a second signal, indicative of the motion of the image in the second axis.

Such prior art two-axis systems therefore require a pair of photo diodes located on orthogonal radii, for detecting the images from the source, and a first and second reference photo diode located in the same plane as said image photo diodes. Systems of this type have been built and constructed and have operated satisfactorily. One such system has included the apparatus described and claimed in the U.S. Pat. No. 3,500,050 to M. J. Hillman, issued Mar. 10, 1970, for "Image Motion Detector and Stabilizer."

These prior art two-axis systems have used beam splitters located in the optical path to ensure that the light image directed to the "X" aperture was the same as the light image directed to the "Y" aperture. This approach was the result of an attempt to increase the accuracy of the system. Each sensor therefore picks up motion in directions that are 90° with respect to the other sensor. In the same manner, a single reference light source could be used with a beam splitter and a pair of orthogonally located photo diodes.

Unfortunately, optical beam splitters used in the present day two-axis systems have created problems arising from their great weight and bulk. Alternatives have included the use of a pair of rotating discs. However, the added complications caused by the second disc and its drive mechanism and the timing relationships between the two discs have more than offset any advantages to be gained over the use of a beam splitter with a single disc.

SUMMARY OF THE INVENTION

In the present invention there is described a two-axis, image motion sensor which detects two separate velocity channels using a single optical channel with only a single photo sensor. A single rotatable disc is employed in the present system.

Located on the disc in the area of the aperture is a first plurality of spaced apart, opaque grid bands that are each substantially at 45° with respect to a given radius line of the disc passing through the aperture. A second plurality of spaced apart opaque grid bands, and preferably at a different spacing to achieve a different spatial frequency, is also located substantially 45° with respect to the same radius lines of said disc, but in a direction that is substantially 45° in the opposite direction. In other words, in the area of the aperture and the given radius line of said disc, the first plurality of spaced apart opaque grid bands would be oriented 90° with respect to the second plurality of spaced apart grid bands.

The disc rotates at a fixed angular rate, thereby allowing each plurality of spaced apart grid bands to generate a different carrier frequency based upon the number of bands and the width of each. The image is focused by suitable optics on the grid pattern, thereby modulating each of the carrier frequencies of the disc with the signal content of the image. The output of the single photo detector is therefore the sum of the two-image motion channels generated by the orthogonally located grid patterns. The two channels can be separated using standard filtering techniques and are then demodulated with respect to the individual carrier frequencies to generate a voltage proportional to the image rate for each axis.

The prior art as evidenced by the above-identified Hillman patent and the patent to P. A. Shaffer, Jr., U.S. Pat. No. 3,537,793, fully describe basic image motion detector systems and the necessary electronics for demodulating and generating a signal proportional to the image for each individual axis.

BRIEF DESCRIPTION OF THE DRAWINGS

Further advantages of the present invention will be made more apparent by referring now to the accompanying drawings wherein.

DESCRIPTION OF THE PREFERRED EMBODIMENTS

Both the present invention and the above-identified Hillman patent utilize the well-known phenomenon that if an image moves over a spatial filter, such as a grid having alternate transparent and opaque bands transverse to the direction of the image instability, the transmitted light energy will fluctuate in time at a rate proportional to the product of image velocity and the grid wave number. In application, the alternating opaque and transparent bands of the optical grid are situated in a direction transverse to the direction of aircraft flight so that an image of the relatively moving ground target is projected through the grid bands that are arranged to be in the direction that is parallel to the flight direction. The transmitted optical signals impinge upon a photo electrical device, such as a photo detector to produce an electrical signal which varies in amplitude at a frequency proportional to the image velocity.

The detected image velocity signal is actually a Doppler signal that modulates the frequency generated by the passage of the bands located on the rotating disc. The received composite image velocity signal can then be easily demodulated by use of a reference signal which is generated at a frequency corresponding to the rate at which the image is interrupted by the grid bands. The reference signal is best generated by means of a stationary, constant light source directed through the moving grid to a photo detecting device. The electrical reference signal produced thereby has a frequency corresponding only to the velocity of the grid bands.

Figure 1:
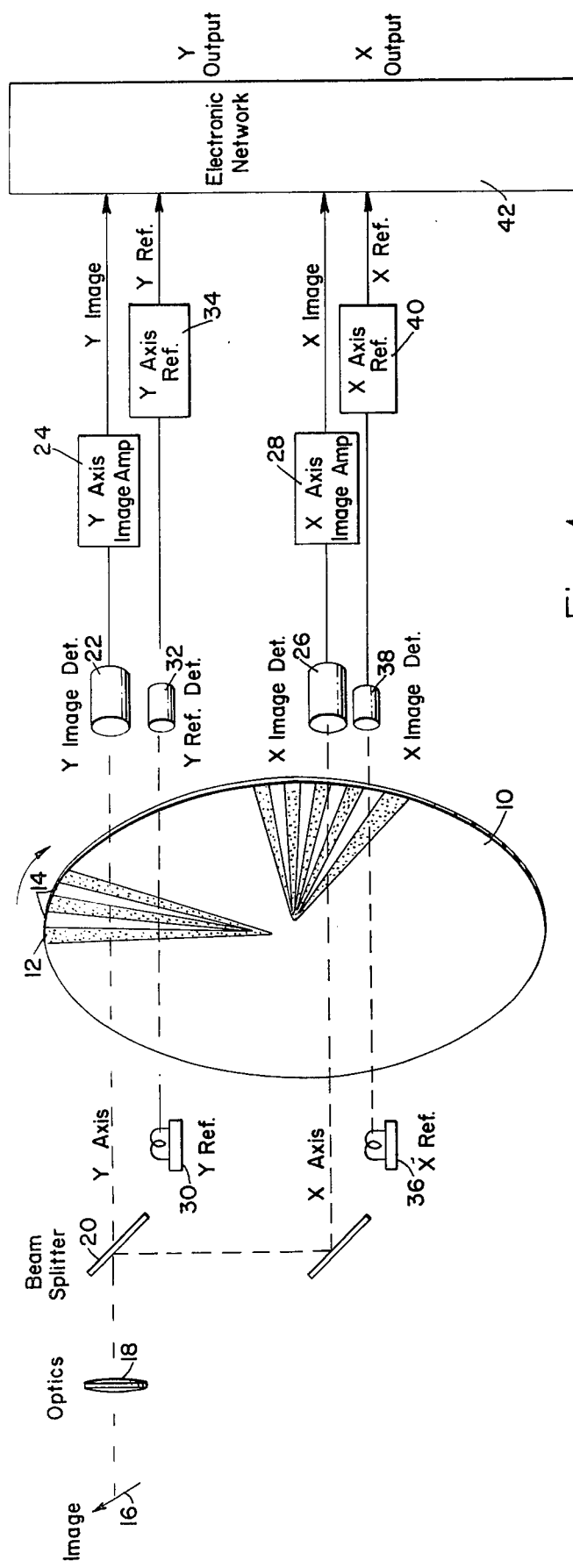
FIG. 1 is a schematic diagram illustrating a prior art embodiment of a two-axis image sensing system using a beam splitter and a single disc.

Referring now to FIG. 1, there is shown a two-axis prior art system utilizing a beam splitter to achieve a Y output and an X output. A disc 10 contains a plurality of equally spaced opaque lines 12, separated by a plurality of equally spaced transparent portions 14. The number of transparent bands in conjunction with the rotational speed of the disc 10 will determine the basic or carrier frequency.

An image 16 is focused by suitable optics 18 on a beam splitter 20. The beam splitter 20 is positioned relative to the moving disc 10 so as to project a pair of signals which are displaced by 90° of arc with respect to each other and which impinge upon locations that are on orthogonal radii of the disc 10. The Y axis signal is detected by a Y axis image photo detector 22, which signal is amplified by a Y axis image amplifier 24. In a similar manner, the X axis signal is detected by an X axis image photo detector 26, which signal is amplified by an X axis image amplifier 28.

A reference signal for the Y axis is obtained by means of a Y reference light source 30 located in the same plane as the Y axis image. The Y reference signal is detected by a Y reference image detector 32 and is amplified by a Y axis reference amplifier 34. Similarly, an X axis reference signal is obtained by means of an X reference light source 36 located on the same X axis, which signal is detected by an X reference photo detector 38 and is fed to an X axis reference amplifier 40.

The Y axis image signal from amplifier 24 is demodulated by the Y axis reference signal from amplifier 34 in an Electronic Network 42 which generates a signal corresponding to and representative of Y output. Similarly, the X axis composite signal from the amplifier 28 is demodulated by the X axis reference signal from amplifier 40 in the Electronic Network 42, which generates a signal representative of and corresponding to the X output.

The prior art system disclosed in FIG. 1 is considered an improvement over earlier systems which required two rotating discs, since the gearing and timing mechanisms required to keep both discs in synchronization was considered formidable and expensive in view of the high costs of creating the individual disc.

Unfortunately, however, the cost savings in using a single rotating disc as illustrated in FIG. 1 can be largely offset by the requirement that a single beam be applied to the two sets of sensors. Since equipment of this kind is normally used in aircraft, the advantage of using a single disc with the attendent weight saving is nullified by the added weight and complexity of the optics required to divide the beam.

The present invention utilizes a novel herringbone pattern on a rotatable disc which accommodates image motion along orthogonal axes. The system provides two separate channels such as an X axis and Y axis channel from a single optical input image utilizing a single photo sensor. In the area of the image aperture there is superimposed on the disc two substantially orthogonal grid patterns of different spatial frequencies, each of which makes a 45° angle with respect to a radius passing through the aperture.

Rotating the disc at a fixed angular rate causes each of the orthogonal grid patterns of different spatial frequencies to generate a corresponding carrier frequency. The image focused on the grid pattern modulates each of the different carrier frequencies generated by the disc.

The single photo detector generates an output signal that represents the sum of the two channels. The output signal is separated using standard filtering techniques and demodulating techniques. A first signal proportional to the image rate along the first axis and a second signal that is proportional to the image rate along the second axis are generated. These first and second signals can then be employed to generate signals representative of the V/R or V/H ratios for the X and Y directions.

Figure 2:
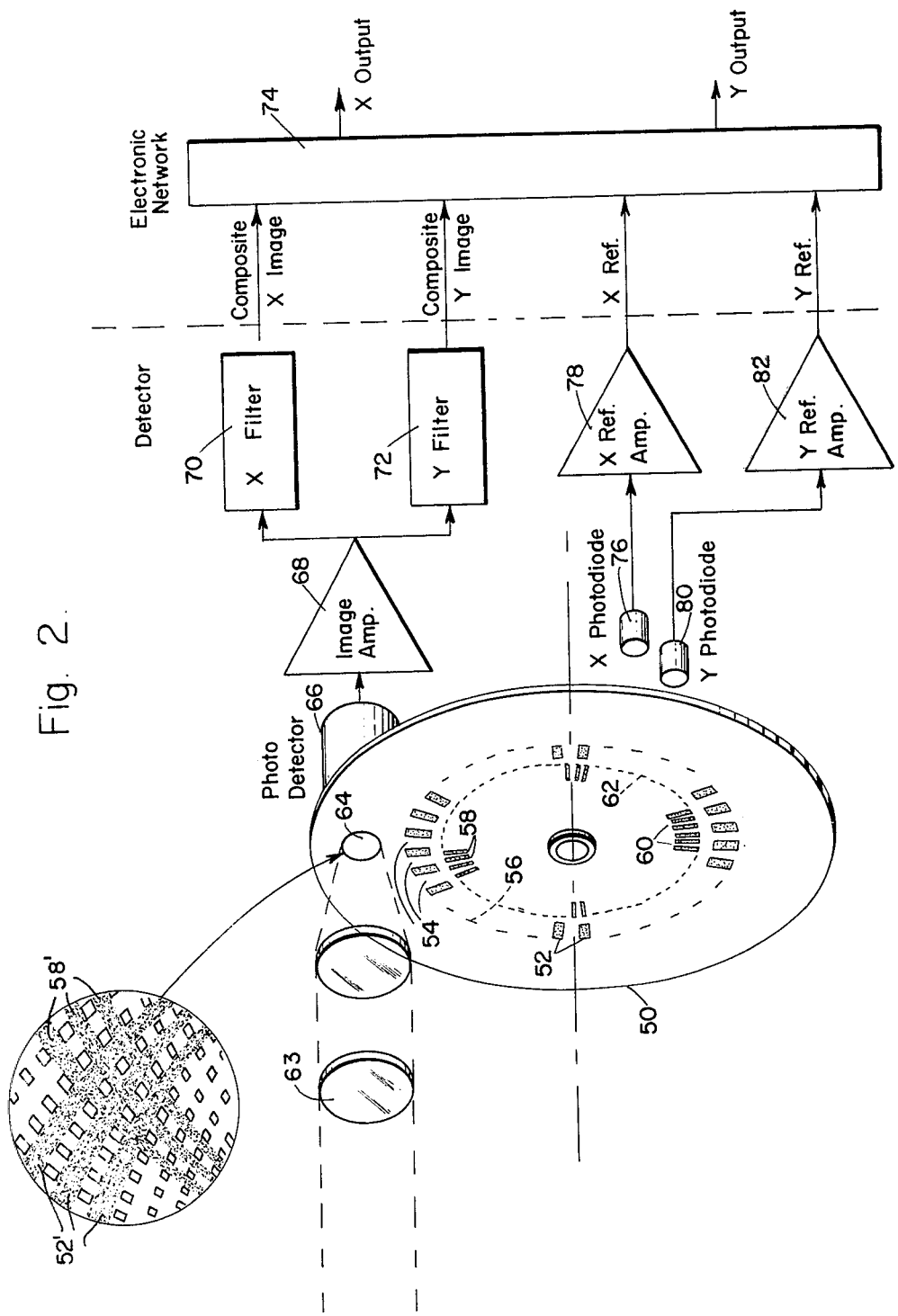
FIG. 2 is a schematic diagram of a two-axis detector according to the present invention illustrating a new and improved disc cooperating with a single photo detector for generating a two-axis output signal.

Turning next to FIG. 2, there is shown a preferred embodiment according to the present invention as a schematic diagram utilizing a single disc 50 for a two-axis system. Located radially on the disc 50 are a first plurality of spaced apart opaque grid bands 52 interspersed by a plurality of radial transparent areas 54 that are equally spaced around the periphery of a given circle 56 on the disc 50. Also located on the disc is a second plurality of spaced apart opaque grid bands 58 interspersed by a plurality of transparent portions 60 that are located radially along the periphery of a second circle 62 located on the disc 50. The number of the first plurality opaque grid bands 52 is preferably different from the number of the second plurality of opaque grid bands 58 in order to generate two different carrier frequencies when the disc 50 is rotated. The purpose of the bands 52, 58 is to generate X and Y reference signals to be used in demodulating the composite output signals.

The image of the ground traversed by the vehicle is focused by a suitable lens system 63 through a fixed aperture 64 and through the rotating disc 50. The two orthogonal grid patterns form a "herringbone" on the rotating disc 50. Construction of the orthogonal grid pattern is more fully illustrated and described in connection with FIGS. 3, 4 and 5.

A photo detector 66 receives the composite carrier frequencies generated by the interruption of the image by orthogonally located rotating opaque bands 52', 58' that are both suitably modulated by the detected image. The output of the photo detector 66 is amplified by an image amplifier 68, which feeds a pair of filters 70, 72 which are "tuned" to filter out the unwanted carrier frequencies, thereby allowing the desired image frequencies to pass into the Electronic Network 74.

An X reference signal is generated by means of a light source (not shown), which is detected through the disc 50 by an X photo diode 76. The X reference signal is amplified by X reference amplifier 78, which feeds the Electronic Network 74 and is used to demodulate the composite X image signal. In a similar manner, a Y photo diode 80 detects the Y reference signal which is amplified by a Y reference amplifier 82, which feeds the Electronic Network 74 and is used to demodulate the Y image signal to produce the Y output.

The inherent advantages of the present invention as in the embodiment of FIG. 2 over the prior art techniques illustrated in FIG. 1 reside in the elimination of the beam splitter portion of the optics. The resulting savings in cost, weight, and space required for the beam splitter operation are in themselves substantial. In addition, a photo detector or photo sensor can be eliminated together with the associated electronics, resulting in further savings of cost, weight, and space. These overall advantages of the system are enhanced by the resultant increase in reliability of the system head with fewer parts needed to achieve satisfactory operation.

Figure 3:
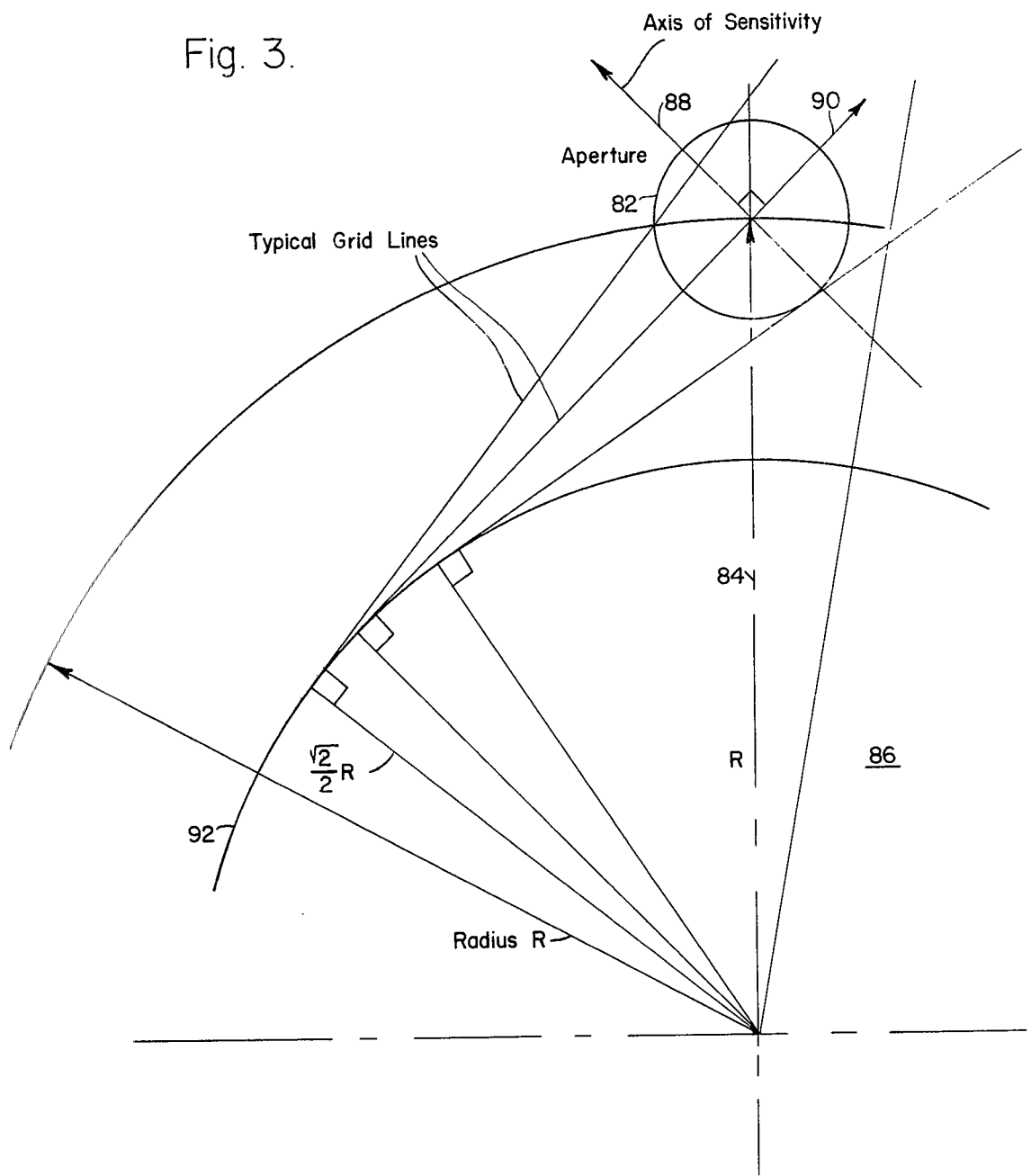
FIG. 3 is a simplified drawing illustrating the basic construction of the grid lines on applicant's new and improved disc.

Referring now to FIG. 3, there is shown the basic disc design for creating two orthogonal grid patterns of different spatial frequencies. The aperture 82 is shown with a radius line 84 passing through the aperture center at one end and through the center of the disc 86 at the other end. In other words, line 84 is a radius line of the disc 86. The geometry of the grid lines is such that in order to obtain orthogonal grid patterns as illustrated by grid lines 88, 90, each being at a 45° angle with respect to the radial line 84, each grid line passing through the center of the aperture 82 must be tangent to a circle 92 having a radius that is 2/2 × the radius R of the disc 86 measured from the center of the disc 86 to the center of the aperture 82. In other words, the orthogonal grid lines each make a 45° angle with the radial line 84 when the grid lines of each frequency band intersect at the center of the aperture 82.

In one embodiment, the number of grid lines 90 was selected for one channel to have 750 opaque areas and 750 clear spaces interspersed between the opaque areas. The spatial frequency of the remaining channel as determined by the grid lines 88 was selected so as not to be a harmonic of the first, in order to be easily separated from the sum of the two frequency channels ultimately selected. In the system actually constructed and tested, the second channel had 590 opaque grid lines separated by 590 clear spaces.

Figure 4:
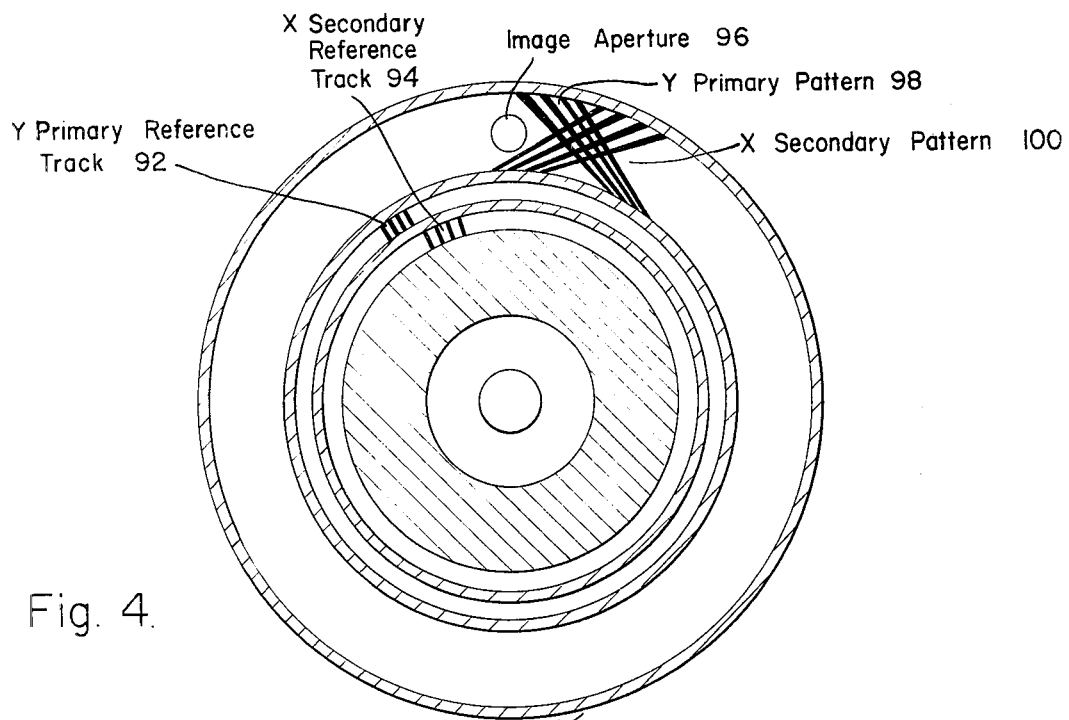
FIG. 4 illustrates an alternative disc having orthogonal grid lines for use with a small area photo detector.
Figure 5:
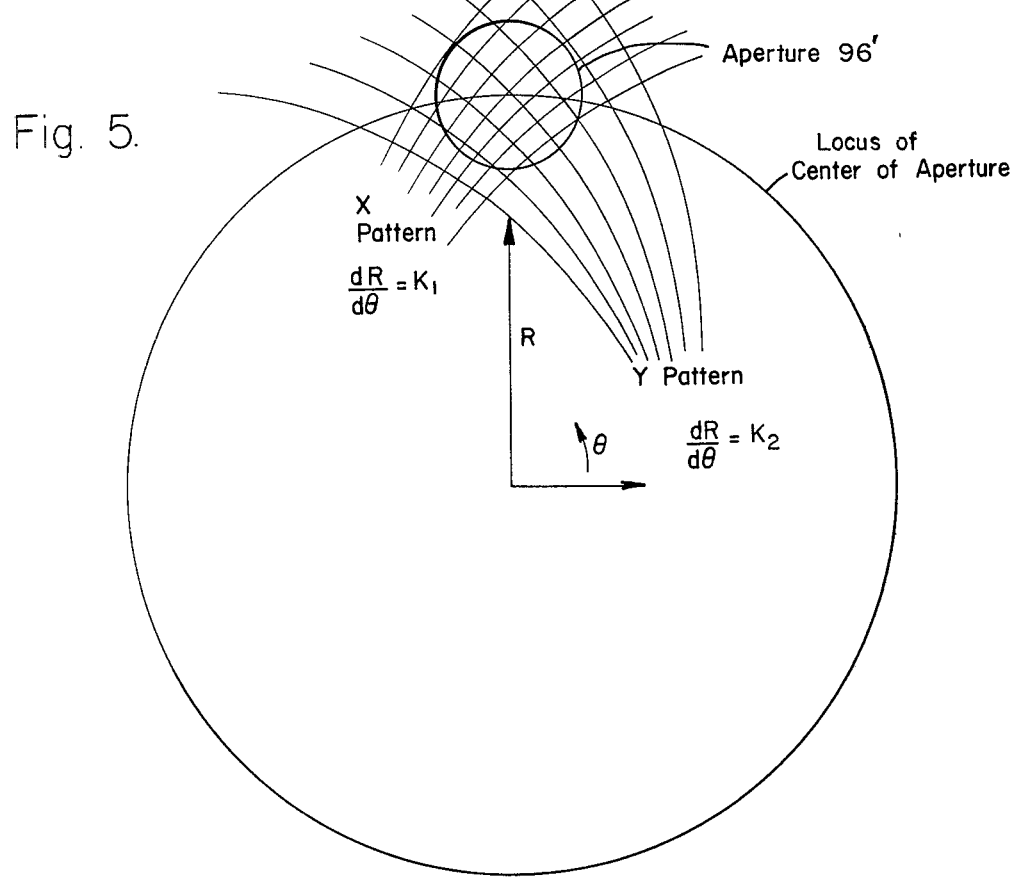
FIG. 5 illustrates a method for generating orthogonal grid bands having a constant slope for use with a large area photo detector.

Referring now to FIG. 4, there is shown a complete herringbone sensor disc having a Y or primary reference track of 750 equally spaced opaque radial bands 92 for use in generating the Y reference signal. A X or secondary reference track includes 590 opaque bands 94 radially located on the disc for use in generating the X reference signal. The image is focused through an image aperture 96 onto the orthogonal grid patterns formed by the primary Y patterns 98 and the secondary X patterns 100.

A review of FIG. 4 will show that while the Y primary pattern 98 and the X secondary patterns 100 are orthogonally related to each other as they pass the image aperture 96, each of the patterns 98, 100 cross the image aperture at a 45° angle, thereby resulting in a signal generated by each carrier frequency that is the cosine of 45°. In other words, the signal strength detected by this system will result in a degraded signal intensity. However, the output signal for each carrier frequency compares favorably with the output of the prior art devices as illustrated in FIG. 1 since the use of the beam splitter 20 causes half of the image intensity signal to be split, one for the Y axis and the other for the X axis, thereby resulting in a signal degradation in each frequency channel that is half of the total image intensity available.

With tie disc rotating in a given direction for a small aperture, it is permissible to use straight grid bands perpendicular to each other since the viewing angle is sufficiently small that a change of radius with respect to viewing angle is a constant one. For a large area aperture for use with a large area photo detector, it is necessary to curve the grid bands for both the X and Y grid patterns to maintain a constant slope $(dR/d\theta = K)$. In the system described therein, the preferred angular relationship using straight grid bands for both the X and Y patterns would hold true only in the center of the aperture. It is necessary that the grid bands for the X pattern and the Y pattern maintain a 45° relationship throughout the small angle change of the disc as it traverses the opening of the wide aperture. It is possible to maintain this relationship by curving the X patterns and the Y patterns in the area of the aperture to have a constant slope $(dR/d\theta = K)$. A review of FIG. 5 will show a disc construction for obtaining a Y pattern having a first frequency and an X pattern having a second frequency in which the patterns are orthogonally related to each other and are at all times within the area of the image aperture at 45° with respect to the radius of the disc.

Other embodiments of the present invention and modifications of the embodiments presented herein may be developed without departing from the essential characteristics thereof. Accordingly, the invention should be limited only by the scope of the claims appended below.

What is claimed as new is:

1. A two-axis image motion detector system comprising:
   a substantially transparent disc rotating at a substantially constant speed;
   a first plurality of uniformly spaced apart opaque grid bands extending around the disc in an annular ring in a pattern of equal width, alternating opaque and transparent areas, each said band being located on said disc at a first angle with respect to a corresponding given radius line of said disc; and
   a second, different plurality of uniformly spaced apart opaque grid bands extending around the disc in said annular ring in a pattern of equal width, alternating opaque and transparent areas, each said band being located on said disc at a second angle with respect to a corresponding given radius line, said second angle being in the direction opposite said first angle, said first and second grid bands being at right angles to each other where said bands intersect a given radius line, the locus of said right angle intersections being a circle concentric with the disc center, whereby said rotating disc generates a first image interrupting frequency with said first plurality of bands and a second, different image interrupting frequency with said second plurality of bands.

2. A system according to claim 1 in which said first plurality of grid bands is located substantially 45° in a first direction with respect to said given radius lines and said second plurality of grid bands is located substantially 45° in the opposite direction from said given radius line.

3. A system according to claim 1 in which said first plurality of opaque grid bands and said second plurality of opaque grid bands have a constant slope of +1, and −1, respectively.

4. A two-axis image motion detector system comprising:
a transparent disc rotating at a substantially constant speed;
a first plurality of uniformly spaced apart, equal width alternating transparent and opaque grid bands, each band being located on said disc substantially 45° with respect to a corresponding given radius line of said disc, for interrupting a radiant beam at a first rate;
a second plurality of uniformly spaced apart, equal width alternating transparent and opaque grid bands, each band being located on said disc substantially 45° in the opposite direction from the given radius line, for interrupting a radiant beam at a second rate, said first and second grid bands being at right angles to each other where said bands intersect the given radius line,
said first plurality of grid bands being greater in number than the number of said plurality of grid bands;
an aperture radially located adjacent the locus of intersections of each band of said first plurality of grid bands and each band of said second plurality of grid bands with the respective radius lines, the center of said aperture being aligned with the locus of said intersections,
each of said first grid bands and each of said second grid bands having a substantially constant slope in the area of said aperture; and
a light detector located behind said rotating disc for receiving images passed by said aperture and interrupted by said grid bands.

5. A two-axis image motion detector system comprising:
a substantially transparent disc rotating at a substantially constant speed;
a first plurality of uniformly spaced apart opaque grid bands extending around the disc in an annular ring, each said band being located on said disc at a first angle with respect to a corresponding given radius line of said disc, each grid band of said first plurality of opaque grid bands being a segment of a curve with an origin at the center of said disc whose generatrix is $dR/d\theta = 1$;
and a second, different plurality of uniformly spaced apart opaque grid bands extending around the disc in said annular ring, and each band of said second plurality of grid bands being a segment of a curve with an origin at the center of said disc whose generatrix is $dR/d\theta = -1$, where R is the radial distance from the center, and $\theta$ is the angular displacement from a different radius for each said curve,
each said band being located on said disc at a second angle with respect to a corresponding given radius line, said second angle being in the direction opposite said first angle,
said first and second grid bands being at right angles to each other where said bands intersect a given radius line, the locus of said right angle intersections being a circle concentric with the disc center, whereby said rotating disc generates a first image interrupting frequency with said first plurality of bands and a second, different image interrupting frequency with said second plurality of bands.

6. The two-axis image motion detector system of claim 5, above, further comprising:
a first annular reference track comprising said first plurality of uniformly spaced apart, radial segments for generating an interruption frequency rate identical to that generated by said first plurality of said grid bands; and
a second annular reference track comprising said second plurality of uniformly spaced apart, radial segments for generating an interruption frequency rate identical to that generated by said second plurality of said grid bands.

7. The two-axis image motion detector system of claim 6, above, further comprising network means coupled to said light detector and responsive to the interruption frequencies generated by said grid bands and by said reference tracks for deriving signals corresponding to and representative of radiation impinging on said first and second plurality of said grid bands.

8. A two-axis image detector system comprising:
a transparent disc rotating at a substantially constant speed;
a first plurality of uniformly spaced apart, opaque grid bands, each band being located on said disc substantially 45° with respect to a corresponding given radius line of said disc, for interrupting a radiant beam at a first rate, each grid band of said first plurality of opaque grid bands being a segment of a curve with an origin at the center of said disc whose generatrix is $dR/d\theta$ 1;
a second plurality of uniformly spaced apart, opaque grid bands, each band being located on said disc substantially 45° in the opposite direction from the given radius line, for interrupting a radiant beam at a second rate, said first and second grid bands being at right angles to each other where said bands intersect the given radius line, each grid band of said second plurality of grid bands being a segment of a curve with an origin at the center of said disc whose generatrix is $dR/d\theta = -1$, where R is the radial distance from the center and $\theta$ is the angular displacement from a different radius for each said curve, said first plurality of grid bands being greater in number than the number of said plurality of grid bands;
an aperture radially located adjacent the locus of intersections of each band of said first plurality of grid bands and each band of said second plurality of grid bands with the respective radius lines, the center of said aperture being aligned with the locus of said intersections,
each of said first grid bands and each of said second grid bands having a substantially constant slope in the area of said aperture; and a light detector located behind said rotating disc for receiving images passed by said aperture and interrupted by said grid bands.

9. A two-axis image motion detector system comprising:
- a transparent disc rotating at a substantially constant speed;
- a first plurality of uniformly spaced apart, opaque grid bands, each band being located on said disc substantially 45° with respect to a corresponding given radius line of said disc, for interrupting a radiant beam at a first rate;
- a second plurality of uniformly spaced apart, opaque grid bands, each band being located on said disc substantially 45° in the opposite direction from the given radius line, for interrupting a radiant beam at a second rate, said first and second grid bands being at right angles to each other where said bands intersect the given radius line,
- said first plurality of grid bands being greater in number than the number of said plurality of grid bands;
- an aperture radially located adjacent the locus of intersections of each band of said first plurality of grid bands and each band of said second plurality of grid bands with the respective radius lines, the center of said aperture being aligned with the locus of said intersections, substantially all intersections within the field of view of said aperture being orthogonal,
- each of said first grid bands and each of said second grid bands having a substantially constant slope in the area of said aperture; and
- a light detector located behind said rotating disc for receiving images passed by said aperture and interrupted by said grid bands.

10. A two-axis image motion detector system comprising:
- a substantially transparent disc rotating at a substantially constant speed;
- a first plurality of uniformly spaced apart opaque grid bands extending around the disc in an annular ring in a pattern of equal width, alternating opaque and transparent areas, each band being located on said disc at a first angle with respect to a corresponding given radius line with said disc;
- a second, different plurality of uniformly spaced apart opaque grid bands extending around the disc in said annular ring in a pattern of equal width, alternating opaque and transparent areas, each band being located on said disc at a second angle with respect to a corresponding given radius line, said second angle being in the direction opposite said first angle,
- said first and second grid bands being at right angles to each other where said bands intersect a given radius line, the locus of said right angle intersections being a circle concentric with the disc center, whereby said rotating disc generates a first image interrupting frequency with said first plurality of bands and a second, different image interrupting frequency with the second plurality of bands;
- a first annular reference track comprising said first plurality of uniformly spaced apart, radial segments alternating with equal width clear segments, for generating an interruption frequency identical to that generated by said first plurality of said grid bands; and,
- a second annular reference track comprising said second plurality of uniformly spaced apart, radial segments alternating with equal width clear segments, for generating an interruption frequency identical to that generated by said second plurality of said grid bands.

11. The two-axis image motion detector system of claim 10, further comprising network means responsive to the interruption frequencies generated by said grid bands and by said reference tracks for deriving signals corresponding to and representative of radiation impinging on said first and second plurality of said grid bands.

* * * * *